US009713091B2

(12) United States Patent
Zhang et al.

(10) Patent No.: US 9,713,091 B2
(45) Date of Patent: Jul. 18, 2017

(54) RADIO LINK FAILURE INFORMATION

(75) Inventors: Yi Zhang, Beijing (CN); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 71 days.

(21) Appl. No.: 14/406,813

(22) PCT Filed: Jun. 12, 2012

(86) PCT No.: PCT/CN2012/076766
§ 371 (c)(1),
(2), (4) Date: Dec. 10, 2014

(87) PCT Pub. No.: WO2013/185286
PCT Pub. Date: Dec. 19, 2013

(65) Prior Publication Data
US 2015/0189598 A1     Jul. 2, 2015

(51) Int. Cl.
| G08C 17/00 | (2006.01) |
| H04W 52/02 | (2009.01) |
| H04W 24/10 | (2009.01) |
| H04W 72/04 | (2009.01) |
| H04W 76/02 | (2009.01) |
| H04W 76/04 | (2009.01) |

(52) U.S. Cl.
CPC ....... *H04W 52/0261* (2013.01); *H04W 24/10* (2013.01); *H04W 52/0212* (2013.01); *H04W 52/0264* (2013.01); *H04W 72/0413* (2013.01); *H04W 76/027* (2013.01); *H04W 76/048* (2013.01); *Y02B 60/50* (2013.01)

(58) Field of Classification Search
None
See application file for complete search history.

(56) References Cited

U.S. PATENT DOCUMENTS

| 2008/0165698 | A1* | 7/2008 | Dalsgaard | H04W 24/10 370/252 |
| 2010/0014429 | A1* | 1/2010 | Kim | H04W 24/00 370/241 |
| 2010/0112956 | A1 | 5/2010 | Jeong et al. | |
| 2011/0183663 | A1 | 7/2011 | Kenehan et al. | |
| 2011/0190016 | A1 | 8/2011 | Hamabe et al. | |
| 2011/0201279 | A1 | 8/2011 | Suzuki et al. | 455/67.11 |
| 2011/0274227 | A1 | 11/2011 | Suemitsu et al. | 375/362 |

FOREIGN PATENT DOCUMENTS

CN     101047481 A     10/2007

OTHER PUBLICATIONS

3GPP TSG-RAN WG2 Meeting #78, Prague, Czech Republic, May 21-25, 2012, R2-123160, "Stage 2 CR on eDDA UE assistance information", Nokia Corporation, et al., 2 pgs.
(Continued)

*Primary Examiner* — Kouroush Mohebbi
(74) *Attorney, Agent, or Firm* — Harrington & Smith

(57) ABSTRACT

A technique, including in a radio link failure report from a communication device information about the power saving state of the communication device.

20 Claims, 4 Drawing Sheets

(56) References Cited

OTHER PUBLICATIONS

3GPP TS36.133 V12.5.0 (Sep. 2014), "3rd Generation Partnership Project; Technical Specification Group Radio Access Network; Evolved Universal Terrestrial Radio Access (E-UTRA); Requirements for support of radio resource management (Release 12)", Section 7.6, 5 pgs.

3GPP TS36.213 V12.3.0 (Sep. 2014), "3rd Generation Partnership Project; Technical Specification Group Radio Access Network; Evolved Universal Terrestrial Radio Access (E-UTRA); Physical layer procedures (Release 12)", Section 4.2.1, 2 pgs.

3GPP TS36.300 V12.3.0 (Sep. 2014), "3rd Generation Partnership Project; Technical Specification Group Radio Access Network; Evolved Universal Terrestrial Radio Access (E-UTRA) and Evolved Universal Terrestrial Radio Access Network (E-UTRAN); overall description; Stage 2 (Release 12)", 215 pgs.

3GPP TS36.331 V12.3.0 (Sep. 2014), "3rd Generation Partnership Project; Technical Specification Group Radio Access Network; Evolved Universal Terrestrial Radio Access (E-UTRA); Radio Resource Control (RRC); Protocol specification (Release 12)", Section 5.3.11, 3 pgs.

3GPP TS 36.133 V10.3.0 (Jun. 2011); 3rd Generation Partnership Project; Technical Specification Group Radio Access Network; Evolved Universal Terrestrial Radio Access (E-UTRA); Requirements for support of radio resource management (Release 10).

3GPP TS 36.331 V10.2.0 (Jun. 2011); 3rd Generation Partnership Project; Technical Specification Group Radio Access Network;Evolved Universal Terrestrial Radio Access (E-UTRA); Radio Resource Control (RRC); Protocol specification (Release 10).

3GPP TS 37.320 V10.1.0 (Mar. 2011); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).

RP-110454; Research in Motion UK Ltd., et al.; "New Work Item Proposal for LTE RAN Enhancements for Diverse Data Applications"; 3GPP TSG RAN Meeting #51; Kansas City, USA, Mar. 15-18, 2011; core and feature part.

* cited by examiner

RADIO LINK FAILURE INFORMATION

Some radio communication systems involve making an assessment of the performance of a radio access network based on reports of information about radio link failures at communication devices served by the radio access network.

It has been found that the usefulness of this information for assessing the performance of the network can depend on the configuration of the communication device at which the determination of radio link failure is made.

The inventors for the present application have identified the challenge of improving the collection of information about radio link failures.

There is hereby provided a method, comprising: including in a radio link failure report from a communication device information about the power saving state of the communication device.

In one embodiment, said information about the power saving state of the communication device includes an indication of the discontinuous reception cycle length of the communication device.

In one embodiment, said information about the power saving state of the communication device includes an indication whether or not the communication device is in a power saving mode as an enhancement for diverse data applications.

In one embodiment, said information about the power saving state of the communication device includes both (i) an indication of the discontinuous reception cycle length of the communication device and (ii) an indication whether or not the communication device is in a power saving mode as an enhancement for diverse data applications.

There is also hereby provided a method, comprising: receiving from an access network an instruction not to indicate the availability of information about a radio link failure for which the value of power saving level indicator is above a predetermined threshold; and in the event of a radio link failure for which the value of said power saving level indicator is above said predetermined threshold, either not logging a radio link failure report, or refraining from indicating the availability of a radio link failure report to the access network.

In one embodiment, said power saving level indicator is the discontinuous reception cycle length.

There is also hereby provided a method comprising: selectively excluding from an assessment of the performance of an access network, information about radio link failures for which the value of a power saving level indicator is above a predetermined threshold.

In one embodiment, said power saving level indicator is the discontinuous reception cycle length.

In one embodiment, the method further comprises configuring communication devices not to indicate the availability of information about radio link failures for which the value of said power saving level indicator is above said predetermined threshold.

In one embodiment, the method further comprises: receiving from communication devices radio link failure reports including information about the radio link failure and each specifying a respective value for said power saving level indicator; and excluding from said assessment, information contained in radio link failure reports for which the specified value of said power saving level indicator is above said predetermined threshold.

In one embodiment, said power saving level indicator includes (i) an indication of the discontinuous reception cycle length of the communication device and/or (ii) an indication whether the communication device is in a power saving mode as an enhancement for diverse data applications.

There is also hereby provided an apparatus comprising: a processor and memory including computer program code, wherein the memory and computer program code are configured to, with the processor, cause the apparatus to: include in a radio link failure report from a communication device information about the power saving state of the communication device.

In one embodiment, said information about the power saving state of the communication device includes an indication of the discontinuous reception cycle length of the communication device.

In one embodiment, said information about the power saving state of the communication device includes an indication whether or not the communication device is in a power saving mode as an enhancement for diverse data applications.

In one embodiment, said information about the power saving state of the communication device includes both (i) an indication of the discontinuous reception cycle length of the communication device and (ii) an indication whether or not the communication device is in a power saving mode as an enhancement for diverse data applications.

There is also hereby provided an apparatus comprising: a processor and memory including computer program code, wherein the memory and computer program code are configured to, with the processor, cause the apparatus to: receive from an access network an instruction not to indicate the availability of information about a radio link failure for which the value of power saving level indicator is above a predetermined threshold; and in the event of a radio link failure for which the value of said power saving level indicator is above said predetermined threshold, either not log a radio link failure report, or refrain from indicating the availability of a radio link failure report to the access network.

In one embodiment, said power saving level indicator is the discontinuous reception cycle length.

There is also hereby provided an apparatus comprising: a processor and memory including computer program code, wherein the memory and computer program code are configured to, with the processor, cause the apparatus to: selectively exclude from an assessment of the performance of an access network, information about radio link failures for which the value of a power saving level indicator is above a predetermined threshold.

In one embodiment, said power saving level indicator is the discontinuous reception cycle length.

In one embodiment, the memory and computer program code are further configured to, with the processor, cause the apparatus to: configure communication devices not to indicate the availability of information about radio link failures for which the value of said power saving level indicator is above said predetermined threshold.

In one embodiment, the memory and computer program code are further configured to, with the processor, cause the apparatus to: receive from communication devices radio link failure reports including information about the radio link failure and each specifying a respective value for said power saving level indicator; and excluding from said assessment, information contained in radio link failure reports for which the specified value of said power saving level indicator is above said predetermined threshold.

In one embodiment, said power saving level indicator includes (i) an indication of the discontinuous reception cycle length of the communication device and/or (ii) an indication whether the communication device is in a power saving mode as an enhancement for diverse data applications.

There is also hereby provided a computer program product comprising program code means which when loaded into a computer controls the computer to: include in a radio link failure report from a communication device information about the power saving state of the communication device.

There is also hereby provided a computer program product comprising program code means which when loaded into a computer controls the computer to: receive from an access network an instruction not to indicate the availability of information about a radio link failure for which the value of power saving level indicator is above a predetermined threshold; and in the event of a radio link failure for which the value of said power saving level indicator is above said predetermined threshold, either not log a radio link failure report, or refrain from indicating the availability of a radio link failure report to the access network.

There is also hereby provided a computer program product comprising program code means which when loaded into a computer controls the computer to: selectively exclude from an assessment of the performance of an access network, information about radio link failures for which the value of a power saving level indicator is above a predetermined threshold.

In one embodiment, a determination of a radio link failure at a communication device in a discontinuous reception connected mode is based on an estimate of the average link quality over a length of time dependent on the discontinuous reception cycle length.

Embodiments of the present invention are described in detail hereunder, by way of example only, with reference to the accompanying drawings, in which.

Embodiments of the invention are described in detail below, by way of example only, in the context of a cellular network operating in accordance with an E-UTRAN standard.

Figure 1:
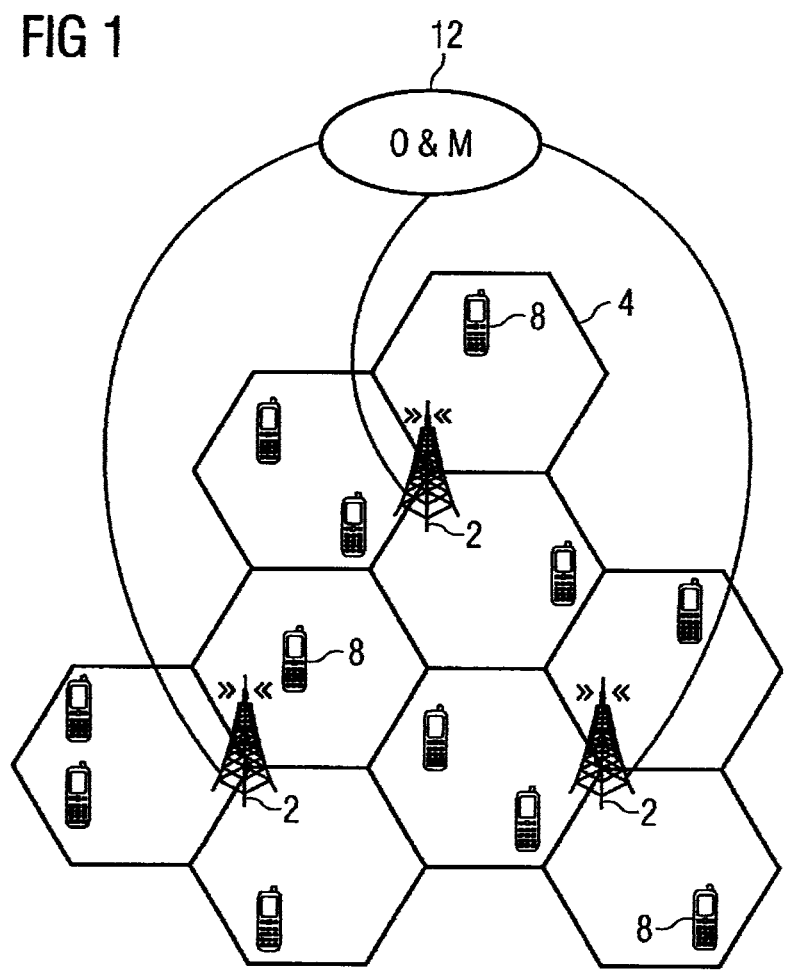
FIG. 1 illustrates an example of a cellular network in which embodiments of the present invention are implemented.

FIG. 1 illustrates an example of a cellular network in which embodiments of the present invention can be implemented. The cellular network includes cells 4 with transceivers at respective eNodeBs (eNBs). Only nine cells are shown in FIG. 1, but a mobile telecommunication network will typically comprise tens of thousands of cells. All eNBs 2 are connected by a wired link to an operations and maintenance (O&M) entity 12. One of the functions of the O&M entity 12 is to collect measurement results for the assessment of the performance of the cellular network.

Figure 2:
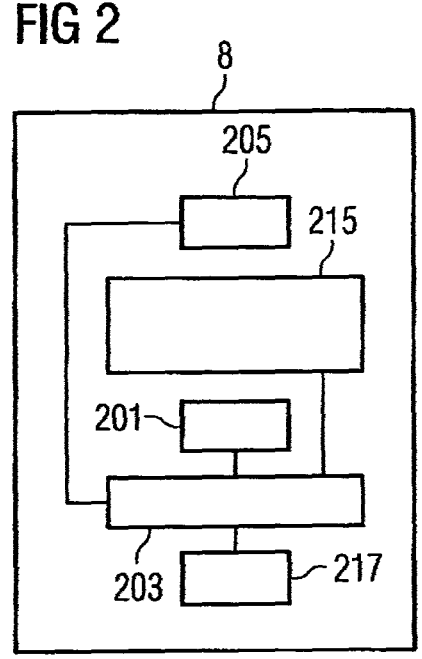
FIG. 2 illustrates an example of apparatus for use at user equipment in FIG. 1.

FIG. 2 shows a schematic view of an example of user equipment 8 that may be used for communicating with the eNBs 2 of FIG. 1 via a wireless interface. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals to or from the eNBs 2 of FIG. 1. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement of the UE 8. The interface arrangement may be provided for example by means of a radio part and associated antenna arrangement. The antenna arrangement may be arranged internally or externally to the UE 8, and may include a plurality of antennas capable of operating in the kind of multi-layer transmission scheme described below.

The UE 8 may be provided with at least one data processing entity 203 and at least one memory or data storage entity 217 for use in tasks it is designed to perform. The data processor 213 and memory 217 may be provided on an appropriate circuit board 219 and/or in chipsets.

The user may control the operation of the UE 8 by means of a suitable user interface such as key pad 201, voice commands, touch sensitive screen or pad, combinations thereof or the like. A display 215, a speaker and a microphone may also be provided. Furthermore, the UE 8 may comprise appropriate connectors (either wired or wireless) to other devices and/or for connecting external accessories, for example hands-free equipment, thereto.

Figure 3:
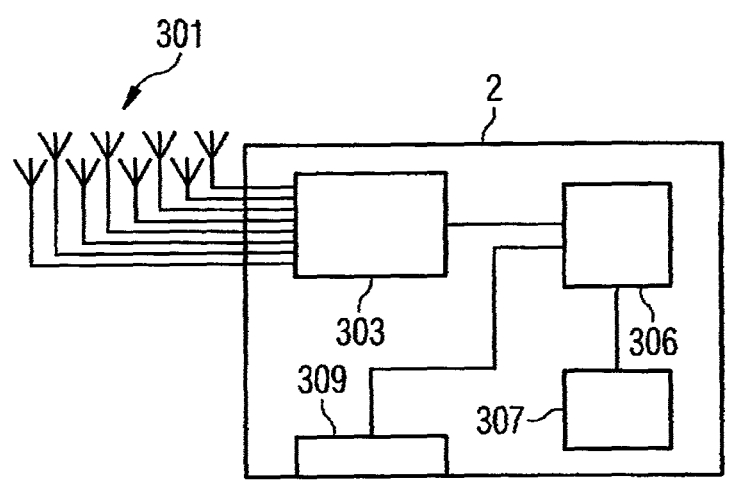
FIG. 3 illustrates an example of apparatus for use at eNodeB in FIG. 1.

FIG. 3 shows an example of apparatus for use at the eNBs 2 of FIG. 1 and for serving the cell 4 in which UE 8 is located. The apparatus comprises a radio frequency antenna array 301 configured to receive and transmit radio frequency signals; radio frequency interface circuitry 303 configured to interface the radio frequency signals received and transmitted by the 8-antenna array 301 and the data processor 306. The radio frequency interface circuitry 303 may also be known as a transceiver. The apparatus also comprises an interface 309 via which it can send and receive information to and from one or more other network nodes. The data processor 306 is configured to process signals from the radio frequency interface circuitry 303, control the radio frequency interface circuitry 303 to generate suitable RF signals to communicate information to the UE 6 via the wireless communications link, and also to exchange information with other network nodes via the interface 309. The memory 307 is used for storing data, parameters and instructions for use by the data processor 306.

It would be appreciated that the apparatus shown in each of FIGS. 2 and 3 described above may comprise further elements which are not directly involved with the embodiments of the invention described hereafter.

Reports of information about radio link failures at UEs 8 is used to assess the performance of the cellular network. The information may include, for example, information about results of measurements at UE 8 of the radio environment of UE 8 at the time a radio link failure (RLF) is determined to have occurred at UE 8; information about the location of UE 8 at the time a RLF is determined to have occurred at UE 8; and information identifying the cell serving UE 8 at the time a RLF is determined to have occurred at UE 8.

When a connection is next established between UE 8 and the cellular network after a RLF, UE 8 indicates to the cellular network the availability of a RLF report, and sends the RLF report in response to a request from the cellular access network. The availability indication takes the form of a RLF info available indicator in RRCConnectionReestablishmentComplete, RRCConnectionSetupComplete or RRCConnectionReconfigurationComplete messages.

The information contained in the RLF reports received from large numbers of UEs 8 served by the cellular network is used for discovering coverage problems and/or for discovering handover problems and optimising handover parameters, in accordance with the procedures detailed in 3GPP TS 36.300 and 3GPP TS 36.331.

With the aim of saving power at UE 8, UE 8 may be configured for discontinuous reception (DRX) while in a Connected State. In the absence of any data transmission for UE 8, UE 8 switches off its receiver for a period of time during one DRX cycle before it next checks a control channel for any indication of a data transmission for UE 8. Because UE 8 remains in a Connected state during these intervals, UE 8 does not need to go through the relatively time-consuming process of establishing a new connection with the cellular network in the event that it detects an indication of a data transmission for UE 8.

The length of the DRX cycle can vary between UEs. For example, with the increasing number of UEs (such as smart phones and laptops) capable of running a wide variety of data applications, and the increasing number of data applications that require seamless delivery and presentation to the user, a long DRX cycle might be used for some UEs to balance such needs for seamless delivery against a desire to reduce power consumption at UE 8.

As specified at 3GPP TS 36.133 Section 7.6, the radio link monitoring and measurement requirements are relaxed to some extent for a UE 8 in DRX mode operation.

As described at 3GPP TS 36.213 Section 4.2.1: in DRX mode operation, the physical layer (Layer 1) at UE 8 is configured to, at least once every DRX period, assess the radio link quality evaluated over the evaluation period specified in Table 7.6.2.2.1-1 (copied below) of 3GPP TS 36.133, which can be as high as 12.8 seconds in the case the DRX cycle length is 2.56 seconds.

TABLE 7.6.2.2-1

$Q_{out}$ and $Q_{in}$ Evaluation Period in DRX

| DRX cycle length (s) | $T_{Evaluate\_Q_{out}\_DRX}$ and $T_{Evaluate\_Q_{in}\_DRX}$ (s) (DRX cycles) |
|---|---|
| ≤0.01 | Non-DRX requirements in section 7.6.2.1 are applicable. |
| 0.01 < DRX cycle ≤ 0.04 | Note (20) |
| 0.04 < DRX cycle ≤ 0.64 | Note (10) |
| 0.64 < DRX cycle ≤ 2.56 | Note (5) |

Note:
Evaluation period length in time depends on the length of the DRX cycle in use When the downlink radio quality estimated over the evaluation period specified in Table 7.6.2.2.1-1 becomes worse than the threshold $Q_{out}$, the physical layer (Layer 1) of UE 8 sends an "out-of-sync" indication to the higher layers of UE 8 within the evaluation period. As specified at 3GPP TS 36.133 Section 7.6, the threshold $Q_{out}$ is defined as the level at which the downlink radio link cannot be reliably received and corresponds to 10% block error rate of a hypothetical PDCCH (physical downlink control channel) transmission taking into account PCFICH (Physical Control Format Indicator Channel) errors.

As specified in 3GPP TS 36.331 Section 5.3.11: upon receiving a pre-specified number of consecutive "out-of-sync" indications from Layer 1 of UE 8, Layer 3 of UE 8 starts timer T310. Timer T310 is not then stopped unless Layer 3 receives a pre-specified number of consecutive "in-sync" indications from Layer 1 while T310 is running, wherein an "in-sync" indication is made when the radio link quality is estimated by Layer 1 over an evaluation period to be better than the threshold $Q_{in}$, which is defined as the level at which the downlink radio link quality can be significantly more reliably received than at $Q_{out}$ and corresponds to 2% block error rate of a hypothetical PDCCH transmission taking into account PCFICH errors.

Figure 4:
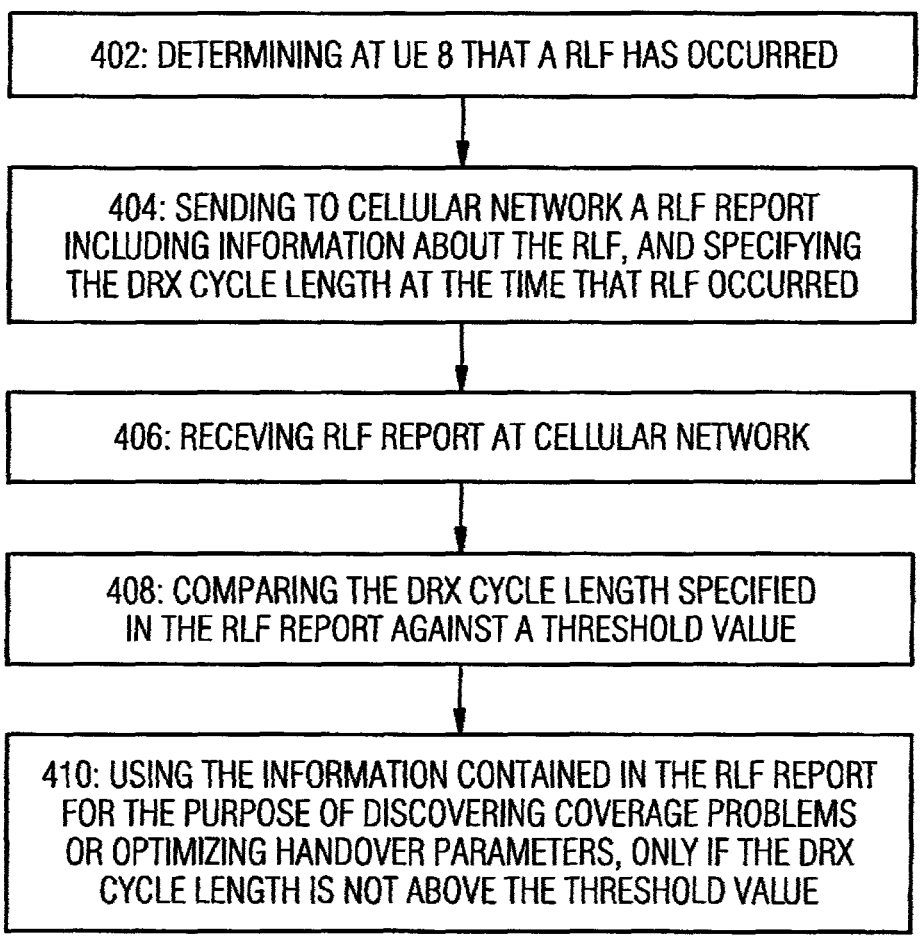
FIG. 4 illustrates an example of operations at a radio access network and user equipment in accordance with an embodiment of the present invention.
Figure 5:
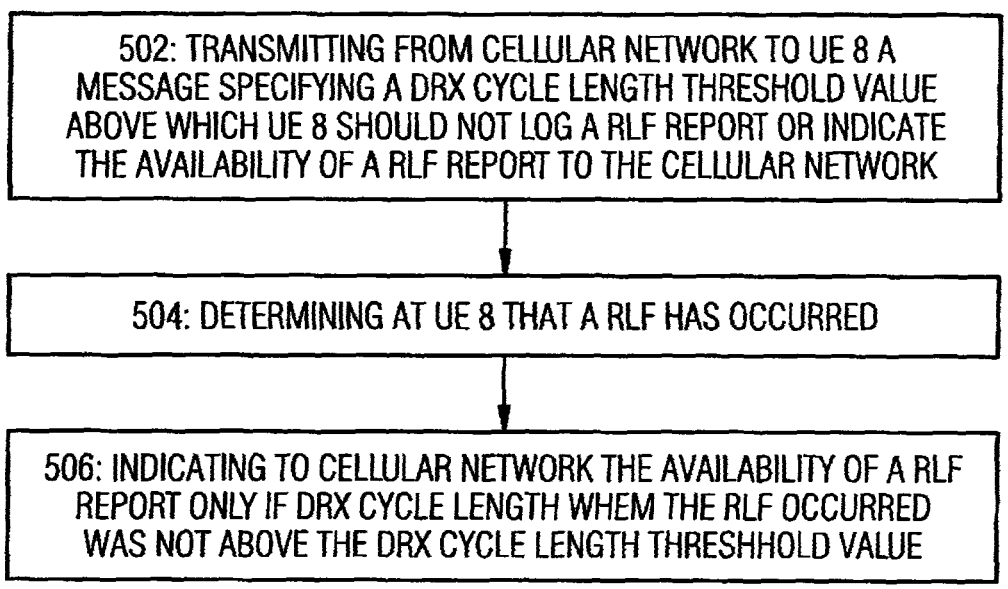
FIG. 5 illustrates an example of operations at a radio access network and user equipment in accordance with another embodiment of the present invention.

When timer T310 expires, Layer 3 of UE 8 determines that a radio link failure has occurred (STEP 402 of FIG. 4 and STEP 504 of FIG. 5).

According to one embodiment of the present invention, when a new connection is later established between UE 8 and the cellular network, UE 8 indicates to the cellular network that a RLF report is available, and in a response to a request from the cellular network sends the RLF report to the cellular network, and includes in the RLF report an indication of the DRX cycle length for UE 8 when the RLF was determined to have occurred (STEP 404 of FIG. 4). Alternatively or additionally, UE 8 includes in the RLF report a 1-bit indication of whether or not UE 8 was in a special power saving state (such as that proposed in R2-123160 from 3GPP TSG-RAN WG2 Meeting #78 as an enhancement for diverse data applications (EDDA)) when the RLF was determined to have occurred.

If the DRX cycle length specified in the RLF report received from UE 8 (STEP 406 of FIG. 4) exceeds a predetermined value, or if the RLF report indicates that UE 8 was in a special power saving state when the RLF was determined to have occurred: then the cellular network determines that the information included in the RLF report is not useful for assessing the performance of the cellular network, and does not use the information contained in the RLF report for that purpose. On the other hand, if the DRX cycle length specified in the RLF report from UE 8 does not exceed the predetermined value, or if the RLF report indicates that UE 8 was not in a special power saving state when the RLF was determined to have occurred: then the cellular network determines that the information included in the RLF report is useful for assessing the performance of the cellular network, and does use the information contained in the RLF report for that purpose (STEP 408).

According to a second embodiment of the present invention: at the time of configuring the RRC connection for which a RLF later occurred, the cellular network identifies in a RRCConnectionReconfiguration message a DRX cycle length threshold value above which UE 8 should not either indicate the availability of a RLF report to the cellular network, or should not even log the RLF report (which leads to the same result of not indicating the availability of a RLF report to the cellular network) (STEP 502 of FIG. 5). If the RLF is determined by UE 8 to have occurred at a time when the DRX cycle length is above said threshold value, UE 8 either refrains from logging the RLF report, or logs the RLF report but does not indicate availability of a RLF report to the cellular network. On the other hand, if the RLF is determined by UE 8 to have occurred at a time when the DRX cycle length is not above said threshold value, UE 8 logs the RLF report and indicates the availability of a RLF report to the cellular network (STEP 506 of FIG. 5).

By excluding, from the assessment of network performance, information about radio link failures that occurred when the DRX cycle length is relatively high, the cellular network can better avoid the risk of taking action that is intended to improve the performance of the network but which happens to worsen the handover configurations and/or negatively affect the performance of the whole network. In this connection, we note that it is found that the higher the DRX cycle length, the greater the risk that there may be a significant delay in RLF detection at UE 8 (because RLF determinations are based on an estimate of the average link quality over a time period specified as a multiple of the DRX cycle length) or that the measurement results included in the RLF report may not be an accurate reflection of UE's situation at the time when the radio link quality deteriorated.

The above-described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

What is claimed is:

1. A method, comprising:
   establishing, after determination of a radio link failure at a communication device communicating via a wireless interface, a new connection of the communication device to a cellular network including sending an indication of availability of a radio link failure report; and
   sending the radio link failure report in response to a request from the cellular network,
   wherein the radio link failure report includes information about a power saving state of the communication device when the radio link failure occurred.

2. A method according to claim 1, wherein said information about the power saving state of the communication device includes an indication of the discontinuous reception cycle length of the communication device.

3. A method according to claim 1, wherein said information about the power saving state of the communication device includes an indication whether or not the communication device is in a power saving mode as an enhancement for diverse data applications.

4. A method according to claim 1, wherein said information about the power saving state of the communication device includes both (i) an indication of the discontinuous reception cycle length of the communication device and (ii) an indication whether or not the communication device is in a power saving mode as an enhancement for diverse data applications.

5. A computer program product comprising a non-transitory computer-readable storage medium bearing computer program code embodied therein for use with a computer, the computer program code comprising code for performing the method of claim 1.

6. A method according to claim 1, wherein the cellular network is an evolved universal terrestrial radio access network.

7. A method, comprising:
   receiving at a communication device communicating via a wireless interface from an access network an instruction not to indicate an availability of information about a radio link failure for which a value of power saving level indicator was above a predetermined threshold when the radio link failure occurred; and
   in case of a radio link failure for which the value of said power saving level indicator is above said predetermined threshold, either not logging a radio link failure report, or refraining from indicating the availability of a radio link failure report to the access network.

8. A method according to claim 7, wherein said power saving level indicator is the discontinuous reception cycle length.

9. A computer program product comprising a non-transitory computer-readable storage medium bearing computer program code embodied therein for use with a computer, the computer program code comprising code for performing the method of claim 7.

10. A method according to claim 7, wherein the cellular network is an evolved universal terrestrial radio access network.

11. A method comprising:
    receiving via a wireless interface a radio link failure report from a communication device of a cellular network, the radio link failure report including information about a power saving state of the communication device when a radio link failure occurred; and
    selectively excluding from an assessment of performance of the cellular network, information about the radio link failure in response to the information about the power saving state indicating a power saving level is above a predetermined threshold.

12. A method according to claim 11, wherein said power saving level indicator is the discontinuous reception cycle length.

13. A method according to claim 11, wherein said power saving level includes at least one of:
    (i) an indication of the discontinuous reception cycle length of the communication device; and
    (ii) an indication whether the communication device is in a power saving mode as an enhancement for diverse data applications.

14. A computer program product comprising a non-transitory computer-readable storage medium bearing computer program code embodied therein for use with a computer, the computer program code comprising code for performing the method of claim 11.

15. A method according to claim 11, wherein said assessment of performance is used for at least one of:
  discovering coverage problems; and
  discovering handover problems in the cellular network.

16. A method according to claim 11, wherein the cellular network is an evolved universal terrestrial radio access network.

17. An apparatus comprising: at least one processor; and
  at least one memory and the computer program code configured, with the at least one processor, to cause the apparatus to perform at least the following:
  receive at a communication device communicating via a wireless interface from an access network an instruction not to indicate an availability of information about a radio link failure for which a value of power saving level indicator was above a predetermined threshold when the radio link failure occurred; and
  in case of a radio link failure for which the value of said power saving level indicator is above said predetermined threshold, either not log a radio link failure report, or refrain from indicating the availability of a radio link failure report to the access network.

18. An apparatus according to claim 17, wherein the cellular network is an evolved universal terrestrial radio access network.

19. An apparatus comprising: at least one processor; and
  at least one memory and the computer program code configured, with the at least one processor, to cause the apparatus to perform at least the following:
  establish, after determination of a radio link failure at a communication device, a new connection of the communication device to a cellular network including sending an indication of availability of a radio link failure report; and
  send the radio link failure report in response to a request from the cellular network;
  wherein the radio link failure report includes information about a power saving state of the communication device when the radio link failure occurred.

20. An apparatus according to claim 19, wherein the cellular network is an evolved universal terrestrial radio access network.

\* \* \* \* \*